United States Patent [19]

Schiff et al.

[11] Patent Number: 4,933,765
[45] Date of Patent: Jun. 12, 1990

[54] ENHANCED TV SYSTEM USING TRANSMITTED ERROR SIGNALS

[75] Inventors: Leonard N. Schiff, Lawrenceville; Jack S. Fuhrer, Princeton Junction, both of N.J.

[73] Assignee: General Electric Company, Princeton, N.J.

[21] Appl. No.: 238,694

[22] Filed: Aug. 30, 1988

[51] Int. Cl.$^5$ .................. H04N 7/04; H04N 11/06
[52] U.S. Cl. ..................... 358/141; 358/11; 358/12; 358/21 V; 358/105; 358/140; 358/142
[58] Field of Search .............. 358/11, 12, 13, 14, 358/15, 16, 21 V, 31, 36, 37, 105, 133, 135, 136, 140, 141, 142, 147, 260, 261.1, 261.2, 426

[56] References Cited

U.S. PATENT DOCUMENTS

| | | | |
|---|---|---|---|
| 4,050,084 | 9/1977 | Rossi | 358/31 |
| 4,202,011 | 5/1980 | Koga | 358/136 |
| 4,598,309 | 7/1986 | Casey | 358/11 |
| 4,617,589 | 10/1986 | Weckenbrock | 358/31 |
| 4,636,840 | 1/1987 | McNeely et al. | 358/31 |
| 4,639,784 | 1/1987 | Fling | 358/167 |
| 4,641,188 | 2/1987 | Dischert | 358/140 |
| 4,660,072 | 4/1987 | Fukinuki | 358/12 |
| 4,661,853 | 4/1987 | Roeder et al. | 358/167 |
| 4,730,217 | 3/1988 | Tonge et al. | 358/105 |
| 4,731,648 | 3/1988 | Bernard et al. | 358/140 |
| 4,794,455 | 12/1988 | Ericsson | 358/136 |
| 4,805,017 | 2/1989 | Kaneko et al. | 358/105 |
| 4,866,509 | 9/1989 | Guida | 358/12 |

FOREIGN PATENT DOCUMENTS 2855395 7/1979 Fed. Rep. of Germany ....... 358/133

OTHER PUBLICATIONS

BBC Research Department; "HDTV Motion Adaptive Bandwidth Reduction Using DATV"; by Storey, pp. 1-7, Jun. 1986.
M. A. Isnardi et al, "Decoding Issues in the ACTV System" IEEE Transactions on Consumer Electronics; vol. 34, Feb 1988, pp. 111-120.
Ser. No. 139,340-Filed 12.29.87-M. A. Isnardi-Extended Definition Widescreen Television Signal Processing System (G. A. Unit 217).
C. P. Sandbank et al, "The Role of DATV in Future Television Emission and Reception", Proc of Third International Colloquium on Advanced Television Systems: HDTV '87, Ottawa Canada pp. 4.4.3-4.4.15.
Y. Ninomiya et al., "A HDTV Broadcasting System Utilizing a Bandwidth Compression Technique-Mose," IEEE Trans. on Broadcasting vol. BV-33, No. 4, Dec. 87, pp. 130-160.
K. Kawai et al., "IDTV Receiver", IEEE Trans. on Consumer Electronics, vol. CE-33, No. 3, Aug. 1987, pp 181-191.
F. Minami et al., "Muse Decoder", Conference Paper CH2564-3/88/000-0192, 1988 IEEE.
Y. Ninomiya et al, "A Single Channel HDTV Broadcast System-The Muse" NHK Laboratories Note, Ser. No. 304, Sep. 1984. (ISSN 0027-657x).

Primary Examiner—John W. Shepperd
Assistant Examiner—Michael D. Parker
Attorney, Agent, or Firm—Joseph S. Tripoli; Eric P. Herrmann; James B. Hayes

[57] ABSTRACT

A television system for generating video signals for reception by a receiver having adaptive processing circuitry susceptible of errors includes circuitry for emulating portions of the receiver and detecting the occurrences of such errors. A signal representing the occurrences of the errors is generated and combined with the transmitted video signal. At the receiver the error signal is separated from the video signal and utilized by the adaptive processing circuitry to ameliorate the effects of such errors.

16 Claims, 7 Drawing Sheets

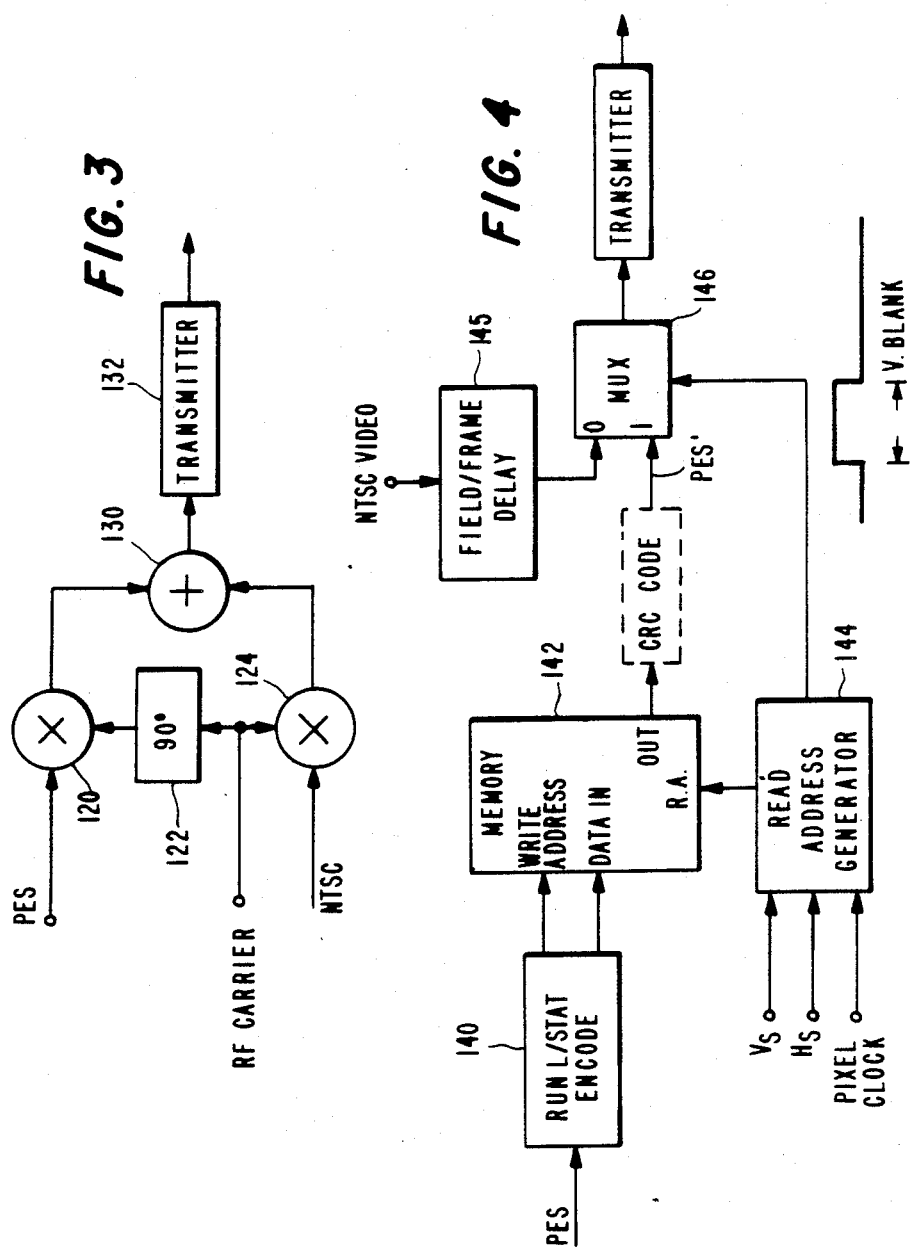

ENHANCED TV SYSTEM USING TRANSMITTED ERROR SIGNALS

This invention relates to enhanced definition television systems.

BACKGROUND OF THE INVENTION

The television industry has been striving to improve the quality of displayed television images. Several techniques which have been employed using standard broadcast television signals include adaptive luma/chroma separation using line and frame comb filters such as described in U.S. Pat. No. 4,617,589, adaptive recursive filters such as described in U.S. Pat. No. 4,639,784, and adaptive non interlaced or progressive scan display scanning apparatus such as described in U.S. Pat. No. 4,598,309. Each of these systems have the potential to significantly improve the displayed images, however the potential has not been fully realized. Each of the systems in general provide the anticipated potential improvements for sequences of particular images. On the other hand for image sequences including, for example, motion of objects within successive images or camera panning, image quality suffers due to the failure to implement cost competitive error free parameter detectors used to control the adaptive processing.

More ambitious techniques to improve image quality involve changes to the standard broadcast signal by adding signal components which among other things effectively increase the luminance signal bandwidth while maintaining the overall signal compatible for reception by current "standard" receivers. Special or extended definition television (EDTV) receivers have been developed to receive the altered broadcast signals and utilize the added signals to produce images of remarkable quality. A difficulty exists in these systems in including sufficient information in the allotted channel spectrum space while maintaining backward compatibility of the signal. An example of an extended definition system is described by M. A. Isnardi et al. entitled "Decoding Issues In The ACTV System", IEEE Trans. on Consumer Electronics, Vol. 34, No. 1, February 1988, pp. 111-120 (also described in U.S. patent application Ser. No. 139,340 filed Dec. 29, 1987). In the Isnardi et al. system three additional signal components are added to the standard NTSC broadcast signal. These signals are amplitude and/or bandwidth compressed before addition to the NTSC signal to avoid their causing interference/artifacts in standard receivers. One of the added components called the V-T helper signal contains interframe difference information which is used by the EDTV receiver to convert the interlaced broadcast video signal into non-interlaced display signals. Due to the amplitude compression of this signal, in noisy environments, the helper signal may fail to provide adequate information.

SUMMARY OF THE INVENTION

The present invention is a television system for producing images of enhanced quality. An embodiment of the invention at the receiving end of the system includes a video processing system having signal parameter adaptive processing apparatus. The processing apparatus includes a signal parameter detector responsive to signal to be processed for generating control signals to adaptively control signal processing. The apparatus further includes a detector for extracting a parameter detector error signal transmitted with the video signal to be processed. Circuitry coupled between the parameter detector and the processing apparatus, is responsive to the parameter detector error signal for compensating erroneous signals generated by the parameter detector.

A further embodiment of the invention, at the transmitting end of the system, includes an encoder for generating the video signal, processing apparatus including a parameter detector which emulates the response of the receiving end processing system for generating control signals, and a further parameter detector incorporated with said encoder for generating substantially error free control signals. A comparator responsive to the control signals from the parameter detector and the substantially error free control signals from the further parameter detector generates a parameter detector error signal. A signal combiner combines the error signal with the video signal from the encoder for transmission to the receiving apparatus.

BRIEF DESCRIPTION OF THE DRAWINGS

FIGS. 2, 3 and 4 are block diagrams of alternative signal combining circuitry which may be implemented in the FIG. 1 circuitry.

DETAILED DESCRIPTION

Figure 1:
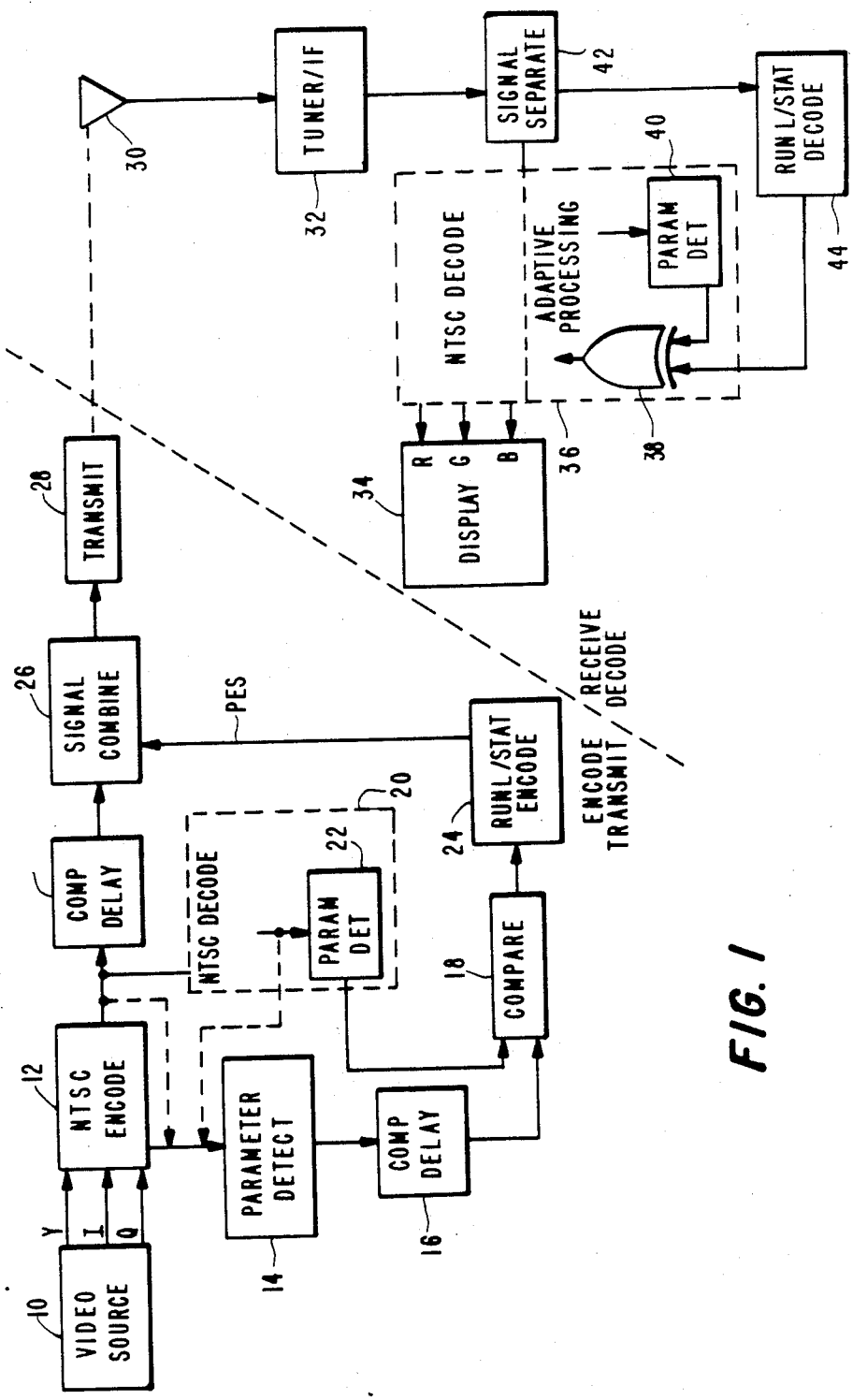
FIG. 1 is a block diagram of a television system embodying the present invention.

FIG. 1 illustrates the basic concepts of the invention. The right hand side of the figure includes circuitry in a television receiver including for example a display or recording device (i.e. a video cassette recorder). The left hand side of the figure shows apparatus for generating signal to be utilized by the receiver circuitry. The signal is in general compatible for reception by standard receivers, but includes additional information transparent to the standard receiver. The additional information corresponds to the parameter error signal (PES), referred to above, for use by the FIG. 1 receiver.

The signal is received by the receiver at antenna 30 and coupled to the tuner/IF circuitry 32 which produces a base band video signal. The base band video signal is applied to a signal separator 42 which separates the PES signal from the video information. The video information is coupled to a video decoder 36 including at least one adaptive processing element. In the decoder 36 is a detector 40 which responds to a signal feature or parameter such as signal amplitude or transitions to generate a signal for controlling the response of the adaptive processing element. The detector 40 is susceptible to producing control signal errors. Control signals from detector 40 and PES signal from separator 42 are coupled to respective input connections of a control signal correction circuit 38. The correction circuit 38 is shown as an exclusive OR gate but may in fact be other circuitry depending on the type of control and PES signals applied. Corrected control signals from correction circuit 38 are coupled to the adaptive processing circuitry within the decoder 36. Decoded signal from the decoder 36 is coupled to, for example, a display device 34.

The PES signal may be formatted in a number of analog or digital forms ranging from spatially correlated analog signals to time division multiplexed compressed digital signals. In the latter instance the PES signal may be first run length encoded, then statistically (e.g. Huffman) encoded to reduce its density and finally time division multiplexed in the blanking intervals of the video signal. In this case the PES signal from the signal separator 42 is coupled to the control signal correction circuit 38 via a run length-statistical decoder 44.

The parameter detector 40 is nominally of simple design to ease design constraints and component costs of the receiver. Due to a lack of sophistication, detector 40 is susceptible to generating a number of erroneous control signals. In general, however the number of errors will be small and thus the PES signal which represents the occurrence of such error will require a relatively narrow bandwidth, for example 200 kHz.

At the transmitting end of the system, image signals are provided by a source 10, which may be a TV camera. The image signals may be in progressive scan or interlaced format and may be component Y,I,Q or R,G,B etc. signals. The component signals are coupled to an encoder 12 which may be an NTSC, PAL, MAC or EDTV encoder. Encoder 12 processes the component signals to produce a video signal in accordance with the desired transmission standard. A decoder 20 is coupled to the output connection of encoder 12. Decoder 20 is similar in design to decoder 36 and includes a parameter detector 22 similar to detector 40. Decoder 20 includes at least enough of the processing circuitry included in decoder 36 so that the output signals from parameter detector 22 substantially emulate the response of detector 40 in decoder 36.

A second parameter detector, 14, designed to produce substantially error free parameter control signals is included in the transmitting circuitry. Input signal to detector 14 may be derived from within the encoder 12, from the output signal of encoder 12 or from within the decoder 20 depending upon the parameter detected and the anticipated source of errors. Parameter detector 14 is sensitive to substantially the same signal feature as parameter detector 22. Output control signals from detectors 14 and 22 are coupled to circuitry 18 which compares signal from detector 22 against signal from detector 14 and produces the parameter error signal PES. The PES signal and the encoded video signal are coupled to circuitry 26 which combines these two signals for transmission.

The PES signal may be run length and statistically encoded (circuit 24) before being coupled to the signal combiner 26.

Depending upon where the signal applied to the input of detector 14 is derived, it may be necessary to include compensating delays, such as delay element 16, in particular signal paths. One skilled in the art of circuit design will readily recognize where compensating delays need to be included.

The design of comparison circuitry 18 may take different forms. For example if the two signals from detectors 14 and 22 are single bit bilevel digital signals circuitry 18 may consist of a single exclusive OR gate which generates a logic one level whenever the two signals are different and a zero logic level otherwise. Alternatively, if the two signals from detectors 14 and 22 are multibit binary, signals circuitry 18 may include a threshold detector in each signal path and an exclusive OR gate coupled to the output connections of the threshold detectors. In a further alternative for multibit binary signals, circuitry 18 may comprise a subtractor with the PES signal taken from the sign bit output or from the difference output. In the latter instance the PES signal is a multibit signal. If desired the multibit PES signal may be reduced to a single bit signal by applying the multibit PES signal to a threshold detector.

Figure 2:
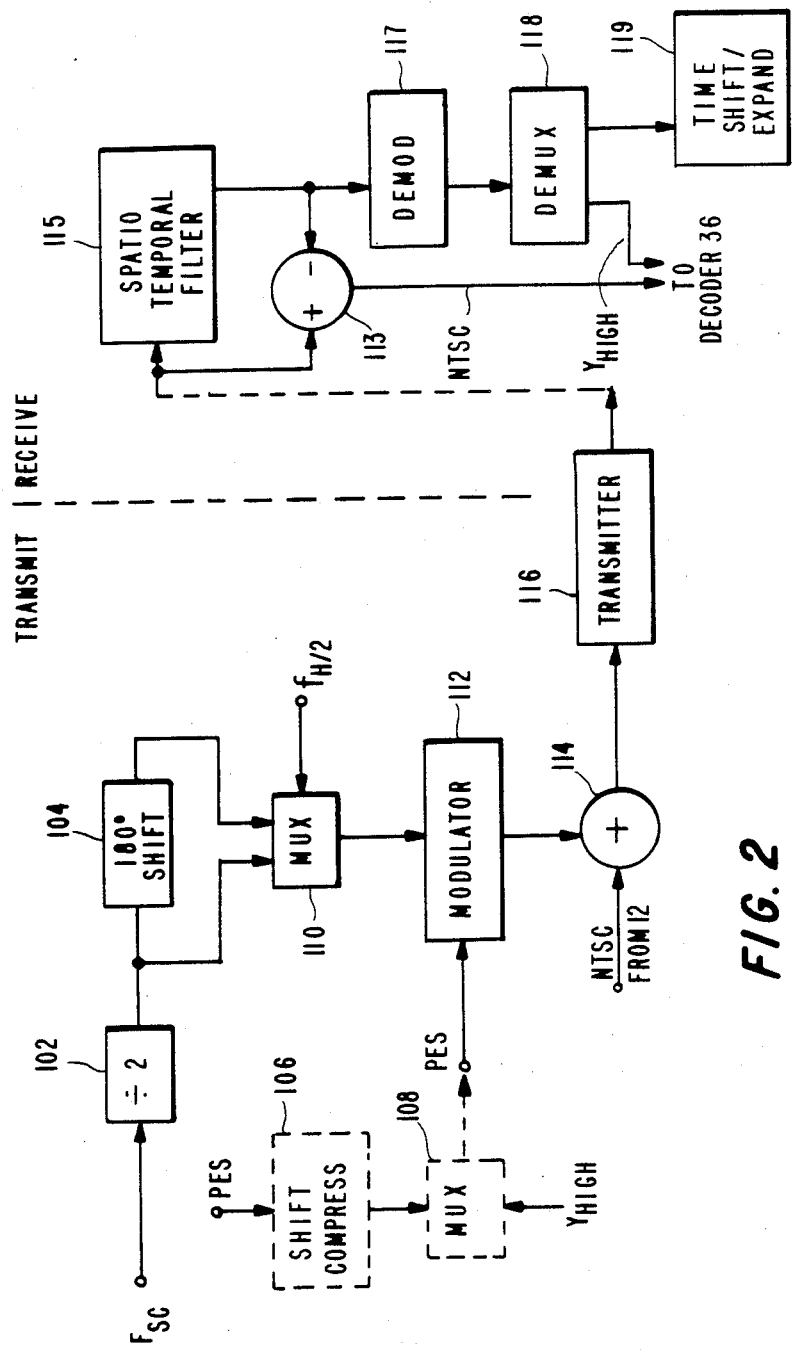

FIG. 2 illustrates a first example of circuitry which may be used as signal combining element 26 and signal separator 42. The circiutry is of the type described in U.S. Pat. No. 4,660,072 which frequency interleaves an auxiliary signal in empty portions of the video spectrum termed the "Fukinuki Hole." The frequency interleaving is similar to the frequency interleaving of chrominance signal in the luminance signal of NTSC video.

In FIG. 2 the color subcarrier signal $F_{SC}$ having a frequency $f_{s2}$ is frequency divided by two in a divider 102 and applied to a 180° phase shifter 104, to develop complementary subcarrier signals at a frequency of $f_{sc/2}$. The complementary subcarriers are applied during alternate horizontal line intervals, via multiplexer 110, to the carrier input terminal of the amplitude modulator 112. The PES signal is coupled to the signal input of the modulator 112. The output of modulator 112 and the video signal from encoder 12 are combined in the signal adder 114 to produce the signal for transmission. With appropriate compensating delay between encoder 12 and adder 114 the PES signal may be spatially correlated to the video signal. In an alternate arrangement the PES signal may be compressed and time shifted (in element 106) to occur during, for example, the horizontal blanking intervals and time division multiplexed in multiplexer 108 with, for example, a luminance high frequency component (described in U.S. Pat. No. 4,660,072) or other auxiliary information, and then applied to the modulator 112.

In the signal separator at the receiving end, the received signal is filtered in a spatio-temporal filter 115 to extract the modulated carrier which is then subtracted from the received signal in subtracter 113 to produce the encoded NTSC component signal. The extracted modulated carrier from filter 115 is demodulated in element 117. Assuming that the modulating signal is time division multiplexed as in the last example, the demodulated signal is applied to a one-to-two demultiplexer 118 which separates the signals $Y_{HIGH}$ and PES into two separate signals. The signal $Y_{HIGH}$ and the signal from the subtracter 113 are coupled to the decoder (for example 36 in FIG. 1). The PES signal is applied to circiutry 119 which time shifts and expands the compressed PES signal so that it is spatially correlated with the video signal. The PES signal is then coupled to the control signal correction circuit 38.

FIG. 3 illustrates a second example of signal combining circuitry. In this circuit the PES signal is combined with the encoded video signal by the technique of quadrature modulation of the picture or RF carrier. In FIG. 3 the RF picture carrier is coupled to the carrier input terminal of a first amplitude modulator 124, and is phase shifted 90 degrees and applied to the carrier input terminal of a second amplitude modulator 120. The video signal and the PES signal are coupled to the signal input terminals of modulators 124 and 120 respectively. The output signals from modulators 120 and 124 are linearly combined in an adder circuit 130 to produce the signal for transmission. At the receiver the video and PES signals may be separated with a synchronous quadrature demodulator.

Note with regard to the FIG. 2 and 3 combining circuits it may be desirable to amplitude compress the PES signal before applying it to the respective modulators.

FIG. 4 illustrates a third example of combining circuitry 26. In this example the PES signal is time division multiplexed into the vertical blanking intervals of the video signal. To accomplish this the PES signal must be compressed and time shifted. This may be executed by the known technique of run length encoding. The run length data may be further compressed by statistical encoding using for example Huffman codes. The encoded signal may thereafter be applied to a cyclic redundancy check (CRC) coder to format the signal for transmission error detection and correction.

In FIG. 4 the PES signal is assumed to be a binary signal and is coupled to an encoder 140 to compress the data from a bit mapped format over a field or frame of an image to a format which can be contained in the vertical blanking interval (or possibly horizontal blanking intervals). Encoder 140 may be a combined run length-statistical encoder. Encoded data from encoder 140, for an entire field or frame is written to memory 142. During the subsequent field/frame vertical blanking interval, the compressed PES data is read out of memory 142 and applied to the multiplexer 146. Video signal, from e.g., encoder 12, is applied to a compensating field/frame delay element 145 and the delayed video signal applied to the multiplexer 146. The field/frame of video data coupled to the multiplexer 146, corresponds to the field/frame of compressed PES signal applied to the multiplexer. Signals to read the PES signal from the memory 142, during the vertical blanking intervals, are generated in address generator 144 which is controlled by horizontal and vertical synchronizing signals Hs and Vs respectively. The rate at which addresses are generated are controlled by the pixel clock signal which is nominally four times the chrominance subcarrier frequency. Address generator 144 also generates a control signal to condition the multiplexer 146 to couple the output from memory 142 to the transmitter during the desired portion of vertical blanking, and to couple the video signal to the transmitter during active portions of the field/frame intervals.

Figure 5A:
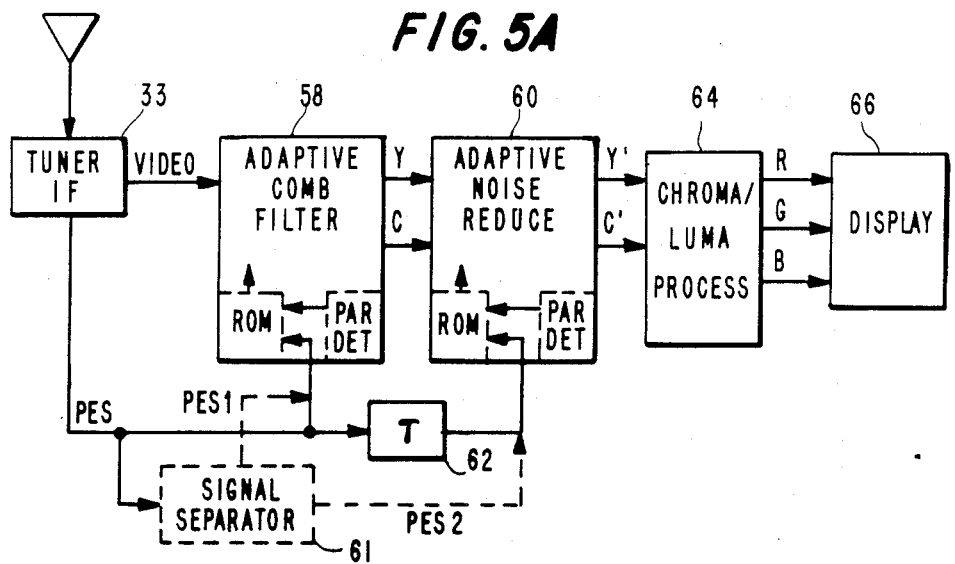
FIG. 5A is a block diagram of a television receiver including adaptive processing circuitry embodying the present invention.

FIG. 5A illustrates a receiver having two adaptive processors, an adaptive comb filter 58 and an adaptive noise reducer 60. Assume that the PES signal is quadrature modulated on the picture carrier as in FIG. 3. The tuner 33 therefore will include a quadrature phase demodulator to separate base band video signal and the PES signal. Assume further that the adaptive comb filter switches between a line comb filter and a frame comb filter for images containing no motion and motion respectively. Assume also that the adaptive noise reducer is a frame type recursive filter having a functional response dependent upon image motion. The parameter detectors in both circuits 58 and 60 will be designed to detect image motion and in fact may be a common detector for both circuits. The PES signal in this instance is a motion error signal and a common PES signal, with appropriate time delay (62), may be applied to both circuits 58 and 60. Nominally in both adaptive frame comb filters and recursive filters the motion signals from motion detectors are multibit signals which are applied to address input terminals of, for example, read-only-memory (ROM) circuits programmed to produce a limited number of weighting signals functionally related to the value of the address signals. The weighting signals are applied as control signals to a soft switch in the comb filter and a signal scaling circuit in the recursive filter. In circuits 58 and 60 motion detection errors are corrected by coupling the PES signal to further address input terminals of the respective ROM circuits which produce the weighting signals. The ROM's in this instance will contain additional stored values to accommodate the additional address bits. Assume first that the PES signal is a single bit signal which only indicates that the signal produced by the local parameter detector is bad, i.e., the detector failed to detect motion or detected motion when there was none. The ROM's are programmed to respond to the combined address of the PES signal and the local parameter detector signal to provide an appropriate default weighting signal selected to provide superior system performance than the erroneous signal, when detection errors are indicated by the PES signal.

Alternatively, if the PES signal is a multibit error signal, having values corresponding to the difference between a correct detection signal and the signal provided by the local detector, the PES may be added to or subtracted from the local detector signal. The sum/difference signal of the PES and local detector signal is coupled to the address input terminals of the respective weighting signal ROM.

In an alternative arrangement the parameter detectors in elements 58 and 60 may be designed to respond to different signal features and therefore elements 58 and 60 require distinct PES signals. To accommodate such a system the transmitted PES signal may be a time or frequency etc. multiplexed signal. The receiver will include a signal separator circuit 61 (shown in phantom) to separate the distinct PES signals and couple them to the appropriate circuitry. For example, the combined PES signal may be a carrier quadrature modulated with two signals PES1 and PES2. Signal separator 61, in this instance, is a quadrature demodulator.

Figure 5B:
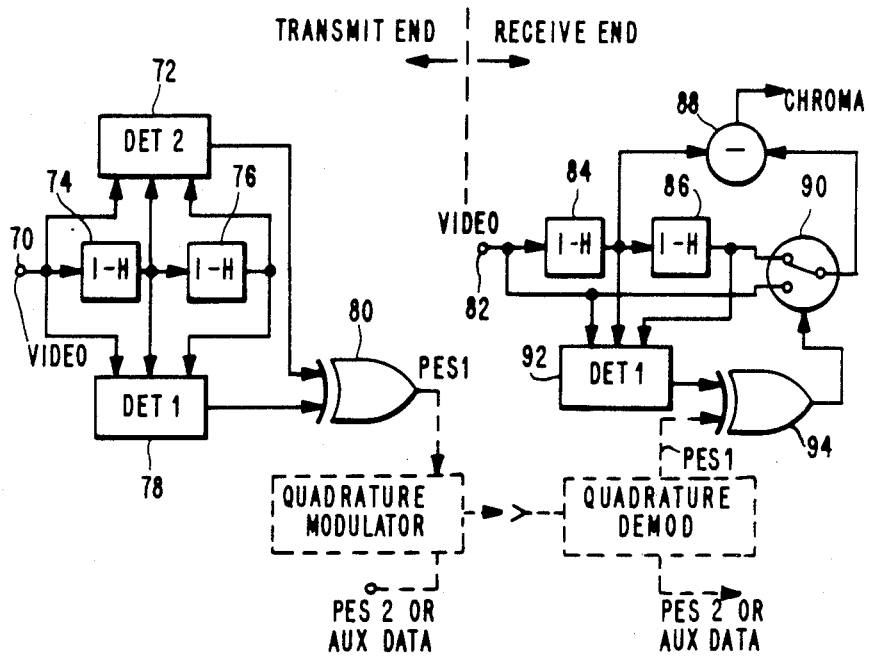
FIG. 5B is a block diagram of exemplary adaptive comb filter apparatus utilizing the present invention.

FIG. 5B illustrates an adaptive line comb filter utilizing the invention. Filters of this type can be designed to avoid substantially all of the undesirable artifacts generated by fixed line comb filters. The adaptive line comb filter selects either a line delayed or a line advanced sample to be combined with the current sample to generate the filtered signal. At the receiver, composite video signal is applied to the cascade connection of two one-horizontal-period delay elements 84 and 86. The current sample is taken from the output of delay element 84, and coupled to one input of subtractor 88. A line delayed sample, taken from the output of delay element 86 is coupled to one terminal of switch 90. A line advanced sample, taken from the input to delay element 84 is coupled to a second terminal of the switch 90, the output of which is coupled to a second input of the subtractor 88. The output signal from subtractor 88 is a line comb filtered chrominance signal. The current, line delayed and line advanced samples are coupled to a parameter detector 92 which may be of the type described in U.S. Pat. No. 4,050,084. This detector 92 determines which one of the advanced or delayed samples has an amplitude value closest to the amplitude value of the current sample, and generates a corresponding output signal. The output signal provided by detector 92 is coupled to one input terminal of an exclusive OR gate 94, the second input of which receives the transmitted PES signal. The output terminal of the exclusive OR gate is coupled to the control input of switch 90.

The PES signal has a logic one value to indicate that detector 92 is anticipated to provide an erroneous signal. For the FIG. 5B system detector 92 develops a bilevel logic output which is complemented by the exclusive OR gate 94 only when the signal PES is a logic one. Thus for all anticipated errors produced by detector 92, the exclusive OR gate 94 corrects the control signals applied to the switch 90.

At the transmitter the decoder 20 (FIG. 1) includes the cascade connection of two one-horizontal-period delay elements 74 and 76, respectively corresponding to elements 84 and 86 in the receiver. A detector 78 of like design to detector 92 is coupled in like fashion to delay elements 74 and 76. Detection signals from detector 78 are coupled to a first input terminal of an exclusive OR gate 80 the output of which provides the parameter error signal (PES). A parameter detector, 72, which is less error prone than detectors 78 and 92 is coupled to delay elements 74 and 76 to provide substantially error free detection signals. Output signal from detector 72 are coupled to a second input terminal of exclusive OR gate 80. Exclusive OR circuit 80 produces a logic one output value, indicating detection errors, only when detectors 72 and 78 concurrently provide different detection signals. Note parameter detector 72 may be of the type described in U.S. Pat. No. 4,636,840.

Figure 6:
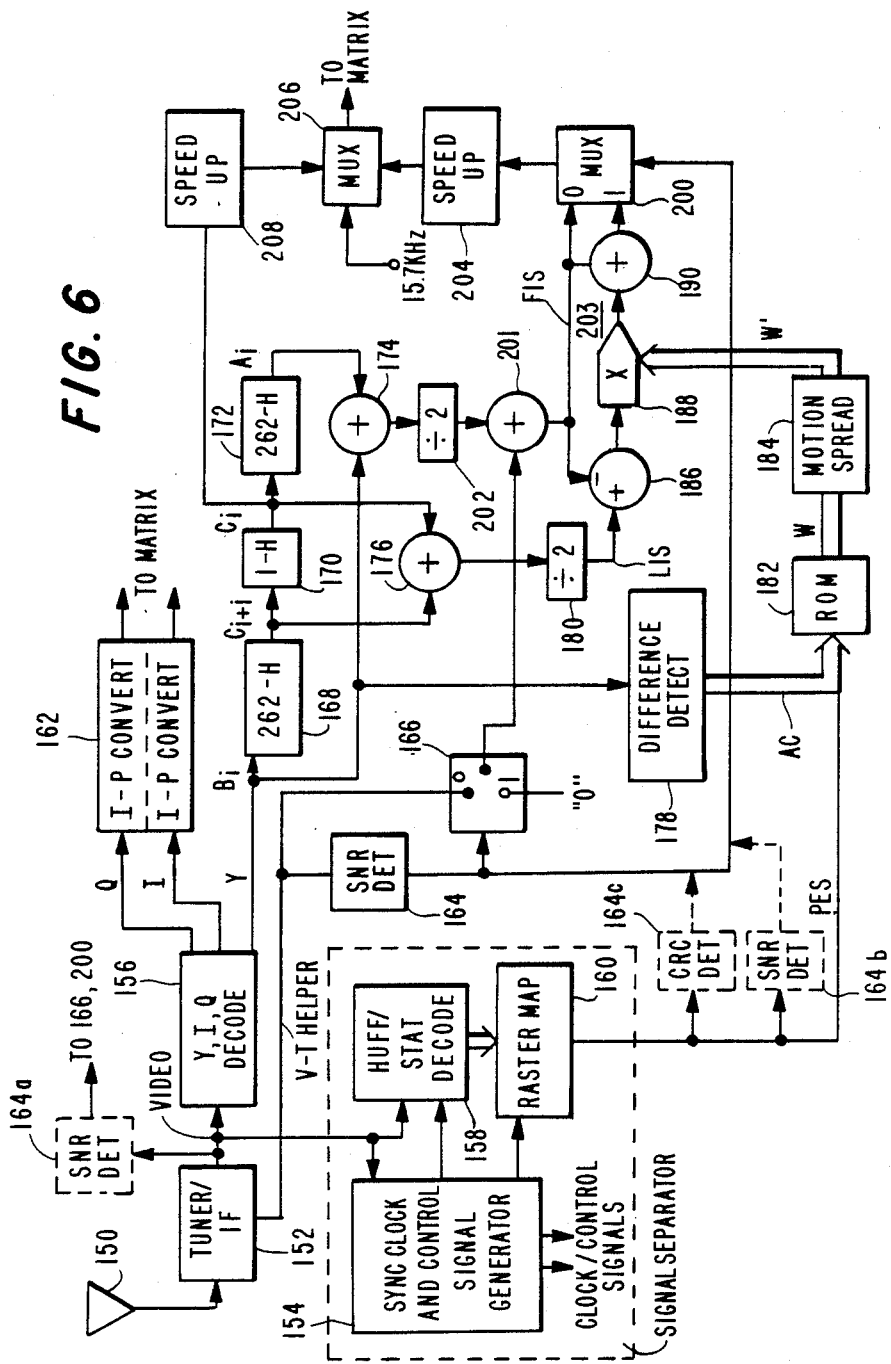
FIG. 6 is a block diagram of an EDTV receiver including an embodiment of the invention.

FIG. 6 illustrates an application of the invention in the environment of an EDTV system of the type described in the ISNARDI et al. article. In an Isnardi et al. type system, a broadcast video signal is generated which is compatible for reception by standard receivers and which when decoded by an EDTV receiver will produce a high resolution, wide aspect ratio image. The generated signal includes added information in the "Fukinuki hole" and information (V-T helper signal) quadrature modulated on the picture carrier. Without changing the current signal format one logical space to include a PES signal is in the vertical blanking interval and such insertion may be accomplished by a FIG. 4 type combining circuit. However it should be understood that with appropriate EDTV signal format changes any of the FIG. 2-4 combining circuits may be implemented to include a PES signal in the EDTV signal. FIG. 6 shows a diagram of a portion of an Isnardi et al. type receiver modified to incorporate use of a PES signal.

Figure 8:
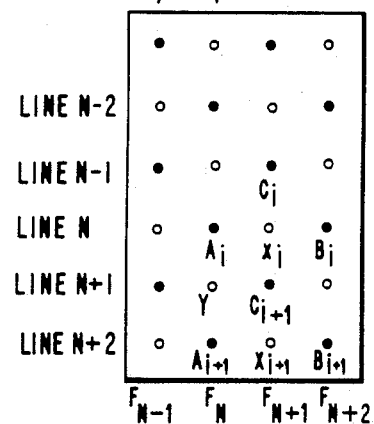
FIG. 8 is a pictoral representation of a portion of a TV signal format useful in describing the FIG. 7 circuitry.

The signal is received by antenna 150 and coupled to the tuner 152 which incorporates a quadrature demodulator to separate the V-T helper signal from the video signal. The received signal is in interlaced format, but the receiver generates a progressive scan display. The V-T helper signal nominally provides the missing luminance information needed to accurately convert an interlace signal to a progressive scan signal. To help in understanding this process refer to FIG. 8. The system utilizes a progressive scan source of image information of for example 525 lines of video per 1/60 of a second. FIG. 8 is intended to represent a portion of several image periods of the source signal. Each dot (filled or empty) represents a line of progressive scan information. The columns $F_{N+i}$ represent, with respect to interlace signals, successive fields. The solid dots represent lines of video information that are ultimately broadcast as the interlace signal. Lines represented by open circles are essentially dropped prior to transmission. The V-T helper signal is generated as the difference between a dropped video line (e.g $X_i$) and the average of the temporally adjacent transmitted lines (e.g $A_i$ and $B_i$), that is $V-T=X_i-(A_i+B_i)/2$. At the receiver, the interlace lines are decoded and time compressed for progressive scan display. The missing lines, for example, $X_i$, are generated by forming the average of the interlace lines (e.g $A_i$ and $B_i$) temporally spanning the missing line and summing this average with the helper signal. That is the generated line $X_i'$ is $$X_i' = (X_i - (A_i+B_i)/2)' + (A_i'+B_i')/2 \approx X_i \qquad (1)$$

The primed letters in the equation represent the transmitted and decoded signals and as such may not exactly represent the original signals. Thus the reconstructed signal $x_i'$ may not exactly represent the original signal $x_i$.

In FIG. 6 the video signal from the tuner 152 is applied to a wide screen interlace decoder 156 which generates Y, I and Q component interlace signals as described in the Isnardi et al. article. The I and Q color difference signals are coupled to the interlace-to-progressive scan converter 162 which performs the conversion by simply repeating the respective lines at twice the interlace scan rate. The progressive scan I and Q signals are coupled to a matrix circuit (not shown) wherein they are combined with luminance signal to produce R, G, B primary color signals for application to a display device.

The interlace widescreen luminance component is coupled to the cascade connection of a 262 line interval delay element 168, a 1 line interval delay element 170 and a 262 line interval delay element 172. The input to delay element 168 and the outputs of delay elements 170 and 172 concurrently provide representative signals from lines $B_i$, $C_i$ and $A_i$ respectively (FIG. 8). The output of delay element 170 is coupled to a speed up element 208 which compresses applied interlaced lines to one half the interlace line interval. The output of speed up circuit 208 is coupled to a first input of a two-to-one multiplexer 206.

The input to delay element 168 and the output from delay element 172 are coupled to adder 174 wherein they are summed. The sums produced by adder 174 are divided in half by divider 202 to produce the averages $(A_i+B_i)/2$ which are coupled to adder 201. The V-T helper signal from tuner 152 is coupled to a second input of the adder 201 to generate the missing lines $x_i$ which have the interlace duration. These lines $x_i$ are time compressed in speed up circuit 204 and coupled to a second input of the multiplexer 206. Multiplexer 206 responsive to an interlace line rate signal alternately couples compressed real lines from speed up circuit 208 and compressed generated lines from speed up circuit 204 to the aforementioned matrix circuit.

The remaining elements in the FIG. 6 apparatus are included to practice the present invention. FIG. 6 includes alternate, motion adaptive, apparatus for generating the missing lines when the V-T helper signal is not reliable.

Nominally, the V-T helper is significantly amplitude compressed before transmission. Consequently the signal-to-noise ratio of the received V-T helper signal will deteriorate in a noisy broadcast environment. In these situations it may be more desirable to have the receiver generate the missing lines $x_i$ autonomously, that is without the aid of the V-T helper signal. To activate the motion adaptive apparatus a signal-to-noise-ratio detector 164 is coupled to receive the V-T helper signal. In the presence of poor quality signal-to-noise ratio, the detector 164 generates a signal to clamp (via switch 166) the V-T helper signal coupled to adder 201 to zero value. In addition the output connection from adder 201 to speed up circuit 204 is interrupted, and the output (adder 190) from the motion adaptive apparatus is coupled to speed up circuit 204 via a multiplexer 200.

The motion adaptive apparatus generates the missing lines $x_i$ via line interpolation or frame interpolation. In the presence of interframe motion the missing line $x_i$ is generated from the average of two vertically adjacent lines ($C_i$ and $C_{i+1}$) from the same field. In the absence of interframe motion the missing line $x_i$ is generated from the average of temporally adjacent lines ($A_i$ and $B_i$). Interframe motion is detected by a difference detector 178 coupled to the interlace luminance signal which determines the differences $B_i - A_i$. (Note the term motion detection is actually a misnomer because interframe differences may occur for reasons other than image object motion such as changes in image brightness.)

Interline or intrafield interpolation is performed by adder 176 and divider 180. Signals from spatially adjacent interlace lines $C_i$ and $C_{i+1}$ from the input and output of one-line delay element 170 are summed in adder 176. These sums are applied to divider 180 which generates interpolated missing lines $x_i = (C_i + C_{i+1})/2$.

Interframe interpolated missing lines $x_i = (A_i + B_i)/2$ are available from divider 202. The interline interpolated lines are coupled directly to one input of a soft switch 203. The interframe interpolated lines are coupled to soft switch 203 via adder 201. (During intervals in which the motion adaptive apparatus is activated the second input (V-T helper signal) to adder 201 is clamped to zero value so the interframe interpolated lines are unaltered by adder 201).

The soft switch 203 consists of subtractor 186 coupled in cascade with a variable scaling element 188 and an adder 190. The interline interpolated signal, LIS, from divider 180 is coupled to the minuend input of subtractor 186. The interframe interpolated signal, FIS, from divider 202 is coupled to adder 190 and the subtrahend input of subtractor 186. The output $x_i$ from adder 190 is equal to $$x_i = W(LIS) + FIS(1-W) \qquad (2)$$

where W is the weighting factor applied to a control input of scaling circuit 188 and the values W nominally have a range from zero to one. The output $x_i$ from adder 190 is coupled to the speed up circuit 204 through multiplier 200.

The weighting factor W may be a bilevel signal equal to zero or one, or it may be a multilevel signal having incremental values over the range zero to one. In both instances W is a function of interframe differences as detected by detector 178. For the latter case the values W may be a nonlinear function of the difference values. This functional relationship may be realized by ROM programming, that is, the differences produced by detector 178 are applied as address codes to a ROM 182 programmed to output values W=f(AC) functionally related to the values of the address codes AC. If desired the values W from the ROM 182 may be temporally/spatially expanded in a motion-spreader 184 before being coupled to the scaling circuit 188.

In the system of FIG. 6 it is desirable to constrain the parameter (difference) detector 178 to a simple design, thus rendering it susceptible to detection errors. To compensate for such errors, its output is supplemented by a received PES signal generated at the transmitter. The PES signal may be coupled to ROM 182 to perform in a manner as described with reference to FIG. 5A.

The signal PES is included in the vertical blanking intervals of the video signal. To extract this signal the video signal from tuner 152 is coupled to a control signal generator 154 and a decoder 158. The control signal generator 154, responsive to the horizontal and vertical synchronization components of the video signal, generates timing and control signals which are coupled to decoder 158 and raster mapper 160.

Decoder 158 responsive to the timing and control signals is conditioned during the appropriate portion of the vertical blanking interval to decompress the PES signal. The decompressed signal from decoder 158 is loaded in the raster mapper (memory) 160 in bit mapped format correlated to the interlaced image. During the active portion of the video signal, the raster mapper 160 is conditioned by the timing and control signals to read out the PES signal in interlaced format. (Note that depending upon the particular design of the decoder 158 it may not be necessary to include a raster mapper 160.

In FIG. 6 the system is switched between operating modes by a signal-to-noise ratio detector connected to be responsive to the V-T helper signal. It will be readily appreciated that signal-to-noise ratio or e.g. signal amplitude or noise detection may be performed on other system signals to effect mode switching. This is exemplified by detectors 164a and 164b in FIG. 6 connected to be responsive to the baseband video and PES signals respectively. If the PES signal is a CRC encoded digital signal, mode switching may be effected responsive to a CRC error detector coupled to the PES signal and exemplified by element 164c.

Figure 7:
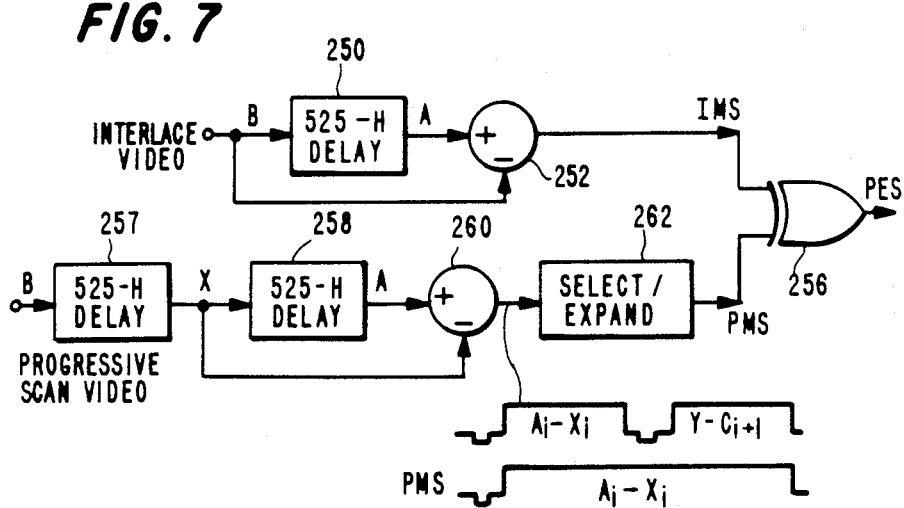
FIG. 7 is a schematic diagram of exemplary circuitry for generating a parameter error signal for an EDTV system embodying the invention.

FIG. 7 illustrates circuitry at the transmitting end of the system for generating the PES signal utilized by the circuitry of FIG. 6. In FIG. 7 elements 250 and 252 exemplify a simple difference detector for use as a detector in the encoder corresponding to detector 178 in FIG. 6. Elements 257, 258, 260 and 262 exemplify an error free difference (parameter) detector in the encoder. In FIG. 7 subtracters 252 and 260 are designed to develop and output signal only if the magnitude of the difference of the applied signals exceeds a predetermined threshold value. Referring to FIGS. 7 and 8 the simple detector (250,252) determines if motion has occurred for a missing line $x_i$ in field $F_{N+1}$, relative to temporally adjacent line $A_i$ in field $F_N$ by determining the magnitude of the differences $|A_i - B_i|$ from fields $F_N$ and $F_{N+2}$. If the magnitude value $|A_i - B_i|$ is greater than a predetermined value an interlace motion signal IMS is produced by the subtracter circuit 252. The detector 257, 258, 260 and 262, on the otherhand, examines the progressive scan lines and determines motion for lines $x_i$ in field/frame $F_{N+1}$ relative to adjacent lines $A_i$ in the preceding field/frame $F_N$ by determining the magnitude of the differences $|A_i-x_i|$. If the magnitude value of $|A_i-x_i|$ is greater than the predetermined value, a progressive scan motion signal, PMS, is generated by the subtracter circuit 260. The signal PMS from subtracter circuit 260 is time compressed relative to the signal IMS since the IMS signal is generated from interlaced signal while the PMS signal is generated from progressive scan signal. In order to spatially correlate the two motion signals the signal PMS is coupled to an alternate line select and expand circuit 262, which provides a signal PMS' representing the values $|A_i-x_i|$ in interlaced form. The motion signals IMS and PMS' are applied to a comparator 256 (shown for illustrative purposes as an exclusive OR gate).

Comparator 256 produces an indication of a detection error if the signals IMS and PMS differ (by a predetermined amount if signals IMS and PMS are for example multibit difference signals). The signal PES from comparator 256 is thereafter coupled to a FIG. 4 type combining circuit for insertion in the vertical blanking intervals of the video signal.

Referring again to FIG. 6, assume that the V-T helper signal and elements 164, 166, 201 and 200 are eliminated, and that adder 190 is coupled directly to speed up circuit 204 and divider 202 is coupled directly to adder 190 and subtractor 186. The remaining circuitry corresponds to a standard receiver implemented with an adaptive interlace-to-progressive scan converter responsive to a PES signal. Note however that the signal separator may take any of the alternate forms described above depending upon the manner the PES signal is combined with the video signal.

Referring to the configuration of the apparatus of FIG. 6 with the foregoing changes where the V-T helper signal has been eliminated a further embodiment eliminates the difference detector 178, and the ROM 182. In this further embodiment, which applies to either an EDTV progressive scan system or a standard receiver with progressive scan, the PES signal is coupled to the motion spreader 184. In the absence of error indications in the PES signal the motion spreader provides a weighting factor of zero so that interframe interpolated signals $x_i$ are applied to speed up circuit 204. When an error indication occurs the motion spreader 184 is conditioned to produce a sequence of incrementally increasing factors from zero to one causing the interpolated values applied to the speed up circuit 204 to gradually change from interframe to interline interpolated values. When the PES signal indicates that errors are no longer present the motion spreader produces weighting factors which incrementally change from one to zero so that the system again responds to interframe interpolated signals $x_i$.

Figure 9:
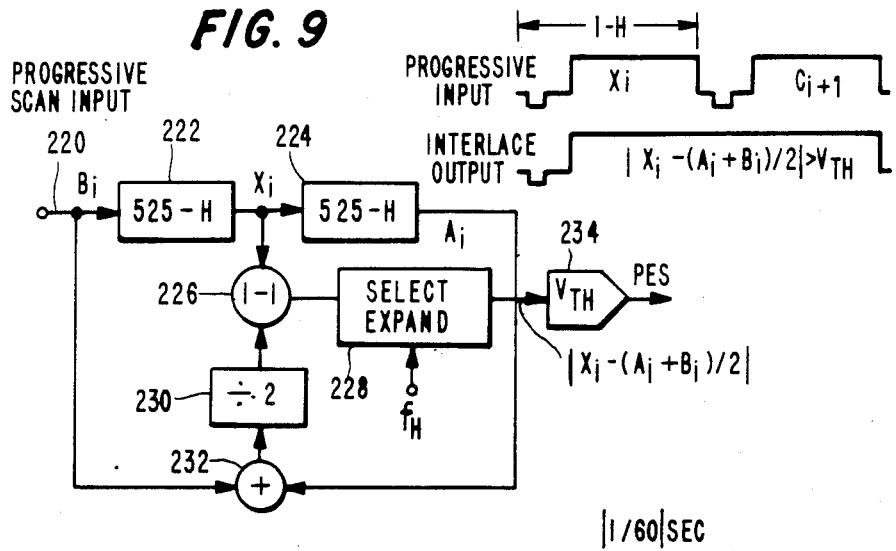
FIG. 9 is a schematic diagram of further apparatus for generating an error signal to be transmitted with an encoded video signal.

In a system of this configuration the PES signal is generated using circuitry exemplified in FIG. 9. Nominally the circuitry of FIG. 6 (without V-T helper) provides interpolated missing lines $x_i'=(A_i'+B_i')/2$. The transmission apparatus can determine if this signal is in error by testing the differences between the original (real) value of $x_i$ and the value $(A_i+B_i)/2$. If the magnitude of the difference exceeds a predetermined value an error indication is generated. In FIG. 9 the progressive scan signals are coupled to the cascade connection of two 525-line delay elements 222 and 224. Input signal, once delayed signal from element 222 and twice delayed signal from element 224 correspond to lines $B_i$, $x_i$ and $A_i$ respectively in FIG. 8. The input and twice delayed signals are coupled to adder 232 which produces the sums $(A_i+B_i)$. These sums are divided by two in divider circuit 230 and coupled to one input terminal of the subtractor 226. The once delayed signal $x_i$ is coupled to a second input terminal of subtractor 226 which is arranged to provide the magnitudes of differences i.e. $|x_i-(A_i+B_i)/2|$. The lines $x_i$ to be deleted occur on alternate lines and are in compressed form relative to the transmitted interlace signal. Consequently the output signal provided by subtracter 226 is in compressed form and only signals on alternate lines corresponds to the deleted lines $x_i$. Alternate lines of the difference magnitudes from the subtractor 226 are selected and time expanded to interlace form in element 228. The values from element 228 are compared against a predetermined value in a threshold detector 234, and if the difference magnitudes exceed this value an error indication is generated. The output of threshold detector 234 is the signal PES which is combined with the video signal via one of the techniques described with reference to FIG. 2–4 etc.

In this last embodiment, with respect to an EDTV system, the PES signal requires significantly less bandwidth than the V-T helper which is a variable true difference signal, because the PES signal is a one bit signal and occurrences of errors are reduced due to the thresholding. However, because the motion detector is eliminated at the receiver, the PES signal will include more error indications than were the motion detector included at the receiver since the PES signal is required to indicate most motion occurrences rather than detector error occurrences.

As a general observation however it should be appreciated by those skilled in the art of systems design, that parameter error signals for adaptive systems will be relatively low bandwidth signals and easily accommodated in compatible broadcast signals. Using PES signals substantially simplifies the design of the receiving apparatus while at the same time enhancing performance.

Figure 10:
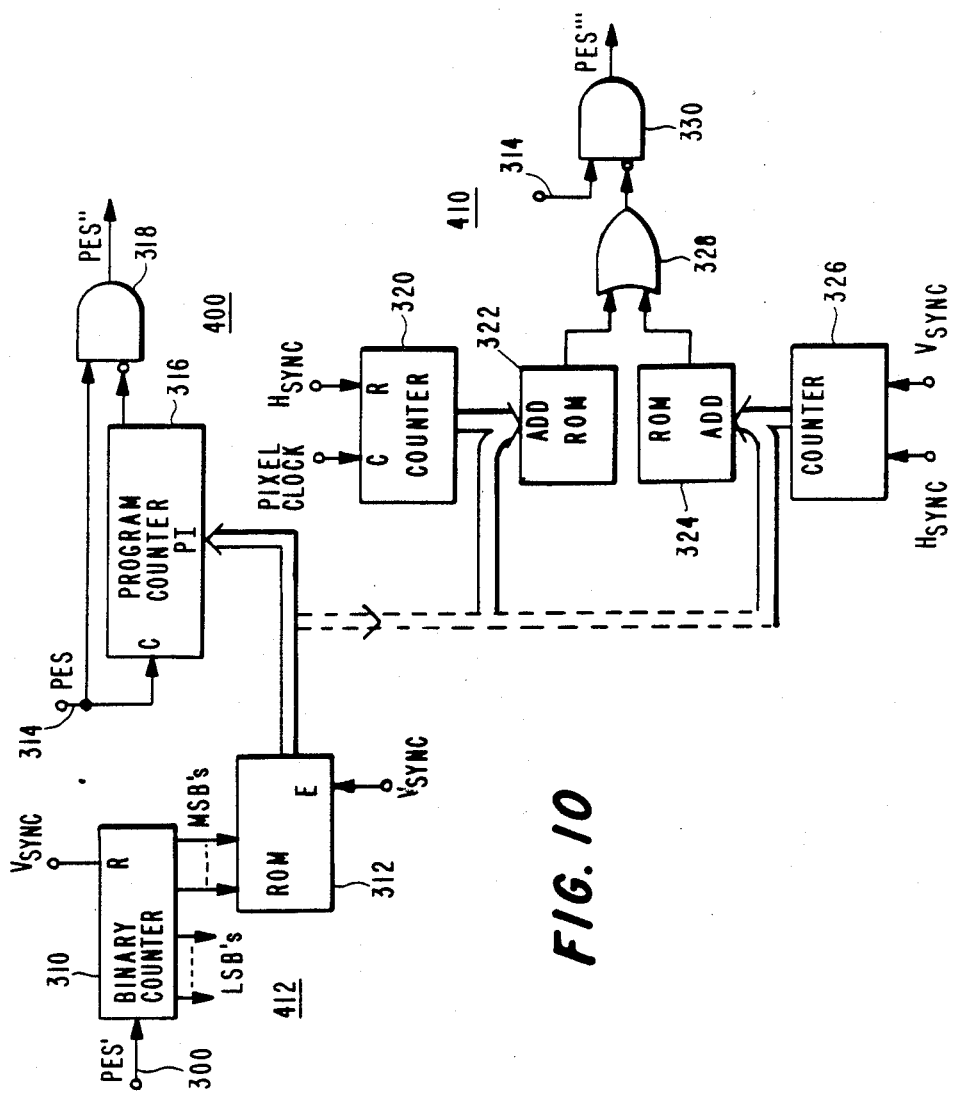
FIG. 10 is a block diagram of circuitry for reducing the frequency of occurrence of the parameter error signal (PES) generated by for example the FIG. 7 circuitry.

Situations may arise wherein the information provided in the PES signal exceeds the available bandwidth of the PES channel. These situations may be accommodated by reducing the number of error detection occurrences represented by the PES signal. This may be implemented by a variety of techniques. For example if the PES signal generator utilizes a threshold value as described with reference to the FIG. 7 and FIG. 9 apparatus, on detection of excessive PES information the threshold values may be increased to lessen the number of apparent errors. Alternatively the PES signal itself may be decimated by blanking (setting to zero) occurrences of error indications. This latter method may be implemented by for example setting every $n^{th}$ error indication to zero or setting all error indications occurring at the periphery of the image to zero. Circuitry for performing both functions is illustrated in FIG. 10. In FIG. 10 circuit 400 blanks every $n^{th}$ occurrence of the PES signal and circuitry 410 blanks the PES signal corresponding to the periphery of the image. Circuitry 412 detects the density of the PES signal and controls the alternative blanking circuits 400 and 410.

The density of the PES signal (density of error occurrence) is determined by counting the occurrences of errors over a predetermined interval. In the arrangement of FIG. 10 the interval is a field period however other intervals, such as horizontal line periods may be utilized. Counting is performed by coupling the PES signal to a binary counter 310 which is reset each field period by the vertical synchronizing pulse $V_{sync}$. Nominally the signal PES' applied to the counter 310 is taken directly from the output of the PES signal generator. However if the system compresses the PES signal, as in the FIG. 4 apparatus, it may be advantageous to count occurrences of the compressed signal, PES'. The more significant bits (MSB's) of the output provided by counter 310 which correspond to numbers of excess occurrences of errors, are coupled to decoding circuitry, such as the address input port of a read-only-memory (ROM) 312. ROM 312 is programmed to provide control signals related to the number of excess occurrences of errors and is enabled each field interval by the signal $V_{sync}$ to provide control signals for the subsequent field interval. In FIG. 10 the counter 310 is coupled directly to the ROM 312, however it may be desirable to interpose an averaging circuit between the counter and ROM so that ROM 312 responds to an average of excess errors over several intervals.

In a first embodiment the control signals provided by ROM 312 are applied to a program-input, PI, of a programmable counter 316. A count input port is coupled to receive the PES signal from the PES signal generator. Programmable counter 316 generates an output pulse coincident with every $n^{th}$ pulse of the PES signal, where the value n is established by the control signal from ROM 312. The PES signal is coupled to one input of a gating circuit 318 and the output signal from the programmable counter 316 is coupled to a second input of gating circuit 318. The output signal from programmable counter 316 conditions the gating circuit 318 to pass the PES signal except during the occurrence of an output pulse from counter 316, thereby deleting every $n^{th}$ occurrence of a pulse of the PES signal. The output signal PES" provided by gating circuit 318 is coupled to the combining circuit, for example element 26 in FIG. 1.

In a second embodiment the control signal from ROM 312 is coupled as partial address codes to control ROM's 322 and 324. In this embodiment a binary counter 320, responsive to a pixel clock and a horizontal synchronizing signal, $H_{sync}$, provides a binary output value corresponding to the current pixel location along each horizontal line of video signal. The binary output value from counter 320 is combined with the control signal from ROM 312 as address input codes to ROM 322. ROM 322, responsive to the address values, is programmed to provide a logic one valued output signal for pixel locations at the beginning and end of each horizontal line interval. In the center portion of each horizontal line, ROM 322 provides a logic zero valued output signal. The number of pixel locations for which a zero valued output is provided is determined by the control signal. Output signal from ROM 322 is coupled to an OR gate 328.

A second binary counter 326, responsive to the signals $H_{sync}$ and $V_{sync}$, provides a binary output value corresponding to the current horizontal line number of the image being processed. The output from counter 326 is combined with the control signal from ROM 312 and applied as address codes to the ROM 324. ROM 324, responsive to the address values, is programmed to provide a logic one valued output signal for horizontal line intervals at the top and bottom of an image, and a logic zero valued output signal for horizontal line intervals in the center portion of the image. The number of horizontal lines for which a zero valued output is provided is established by the control signal from ROM 312. The output signal from ROM 324 is coupled to a second input of the OR gate 328.

The output signal from OR gate 328 and the PES signal are coupled to respective input terminals of a gating circuit 330. The output signal PES''' of the gating circuit 330 is coupled to the combining circuit such as element 26 in FIG. 1. The gating circuit 330 is conditioned by the signal provided by the OR gate 328 to pass the PES signal except when either ROM 322 or ROM 324 provides a logic one output value. Thus the signal PES''' represents that portion of the PES signal corresponding to the center portion of the displayed image. Note, in this embodiment, either the counter 320-ROM 322 or the counter 326-ROM 324 combinations may be eliminated to simplify the hardware.

What is claimed is:

1. A television system including a receiver having adaptive processing circuitry responsive to control signals generated by a parameter detector for detecting a parameter of received video signal, said parameter detector subject to detection errors, and having means responsive to a signal PES for compensating for said detection errors; including a signal encoding and transmission means responsive to a video input signal for providing signal to said receiver, said signal encoding and transmission means including circuitry responsive to encoded video signal for emulating responses of said parameter detector and generating a first signal indicating said parameter, means responsive to said video input signal for generating a second signal indicating said parameter, said second signal being less susceptible of errors than said first signal, and means responsive to said first and second signals for generating said signal PES indicating the occurrence of, but not the value of, said detection errors, for delivery to said receiver.

2. Apparatus for generating a television signal for reception by a receiver having adaptive processing circuitry variably responsive to a detected parameter representing a signal feature and susceptible to errors of detection of such parameter, said apparatus comprising:
   a source of image signals;
   encoding means coupled to said source for generating an encoded image signal for transmission;
   decoding means coupled to said encoding means including means for emulating said adaptive processing circuitry to generate a first signal representing said parameter;
   a parameter detector, coupled to said source, for generating a second signal representing said parameter, said second signal being less susceptible to errors than said first signal;
   means, coupled to said parameter detector and said decoding means, and responsive to said first and second signals, for generating a signal, PES, indicating only occurrences of parameter detection errors by said means for emulating; and
   means including means for separably combining said encoded image signal and said PES signal.

3. The apparatus set forth in claim 2 wherein said means including means for separably combining comprises a quadrature modulator for quadrature modulating a RF carrier with said encoded image signal and said PES signal.

4. The apparatus set forth in claim 2 wherein said encoded image signal is formatted according to a baseband television standard and said means including means for separably combining comprises:
a source of subcarrier signal;
means for modulating said subcarrier signal with said PES signal; and
combining means for forming an algebraic sum of said modulated subcarrier and said encoded image signal.

5. The apparatus set forth in claim 2 wherein said encoded image signal is formatted according to a baseband television standard including blanking intervals and said means including means for separably combining comprises:
means for compressing said PES signal; and
means for time division multiplexing said compressed PES signal into said blanking intervals of said encoded image signal.

6. The apparatus set forth in claim 2 wherein said means for emulating said adaptive precessing circuitry includes a first parameter detector for generating said first signal representing said parameter; and
wherein said means for generating a signal PES includes;
comparing means responsive to said first and second signals, for generating said signal PES in accordance with a predetermined function of the relative values of said first and second signals.

7. The apparatus set forth in claim 2 wherein said means including means for separably combining includes:
a source of auxiliary signal;
means for separably combining said auxiliary signal and said signal PES; and
means for separably combining said encoded image signal with said combined auxiliary signal and signal PES.

8. The apparatus set forth in claim 2 further including:
transmission means for delivering the combined encoded image signal and signal PES to said receiver; and
wherein said receiver includes;
means for detecting said combined signal;
means coupled to said detecting means for separating said encoded image signal and said signal PES;
adaptive processing means responsive to said separated encoded image signal and including a parameter detector susceptible of detection errors for generating a parameter signal indicative of a feature of said image signal, said generated parameter signal for controlling said adaptive processing means; and
means responsive to said separated signal PES and said generated parameter signal for altering a transfer function of said adaptive processing means.

9. The apparatus set forth in claim 8 wherein said adaptive processing means is an interlace to progressive scan converter and said parameter detector is a motion detector.

10. The apparatus set forth in claim 8 wherein said adaptive processing means is a comb filter and said parameter detector is a correlation detector.

11. The apparatus set forth in claim 2 wherein said means including means for separably combining includes:
means, responsive to the signal PES, for determining the frequency of occurrences of detection errors in a predetermined interval, and generating a control signal;
means, responsive to said signal PES and said control signal, for compressing said signal PES to produce a signal PES'; and
means for combining said signal PES' and said encoded image signal.

12. A video signal processing apparatus for responding to a combined signal including a video signal and a parameter error signal, said parameter error signal representing occurrences of, but not values of, processing errors to which said processing apparatus is susceptible, said video signal processing apparatus comprising:
means for receiving said combined signal;
means responsive to said combined signal for separating said video signal and said parameter error signal;
circuitry, including adaptive processing circuitry responsive to said video signal, for variably processing said video signal responsive to a control signal; and a parameter decoder, responsive to a parameter representing a feature of said video signal, for generating said control signal, said parameter detector being susceptible to detection errors; and
means responsive to said separated parameter error signal for modifying the transfer function of said adaptive-processing circuitry when said parameter error signal indicates that said parameter detector will exhibit detection errors.

13. The video signal processing apparatus set forth in claim 12 wherein said combined signal includes an interlace scan EDTV video signal having a helper signal for aiding interlace-to-progressive scan conversion of decoded video signal and wherein said circuitry including adaptive processing circuitry comprises:
a decoder responsive to said separated video signal for generating an interlace scan luminance video signal;
an interface-to-progressive-scan converter, responsive to said interlace scan luminance signal and said helper signal, for generating a first progressive scan luminance signal;
a motion adaptive interlace-to-progressive scan converter including interpolating means responsive to said interlace scan luminance signal and said control signal for generating a second progressive scan luminance signal, and including a motion detector responsive to said video signal and susceptible of detection errors, for generating said control signal; and
wherein the means for modifying the transfer function includes means responsive to said parameter error signal for selecting which of said first and second progressive scan luminance signals will be utilized by said video signal processing apparatus.

14. The video signal processing apparatus set forth in claim 12 wherein said circuitry including adaptive processing circuitry includes:
a decoder responsive to said video signal for generating an interlace scan luminance signal;
an interlace-to-progressive-scan converter coupled to said decoder and conditioned by said control signal to produce progressive scan luminance signal with selected responses; and wherein said parameter detector includes a motion detector susceptible of detection errors coupled to said decoder and responsive to image changes represented by said interlace scan luminance signal for generating said control signal.

15. The apparatus set forth in claim 2 wherein:

said source provides a progressive scan image signal;

said encoding means includes means responsive to said progressive scan image signal for generating a baseband interlace scan image signal in conformance with a broadcast standard; wherein alternate lines of said progressive scan image signal are deleted in forming said interlace scan image signal;

said decoding means includes means responsive to said interlace scan image signal for generating said first signal representing a difference between the values of signal representing temporally adjacent lines;

said parameter detector includes means, responsive to said progressive scan image signal, for generating said second signal representing the difference between the value of signal from a line to be deleted and the value of signal from one of temporally adjacent lines to said line to be deleted; and said means for generating said signal, PES, includes means for comparing said first and second signals.

16. The apparatus set forth in claim 12 wherein said circuitry, including adaptive processing circuitry comprises:

means responsive to said video signal for generating a component signal including one of a luminance and color difference component in interlace form;

a motion adaptive interlace-to-progressive scan converter coupled to said means for generating said component signal for generating a progressive scan component signal; and wherein said means for modifying the transfer function conditions the motion adaptive interlace-to-progressive scan converter to operate in a predetermined mode when said parameter error signal indicates an occurrence of an error.

* * * * *